(12) United States Patent
Nouvel et al.

(10) Patent No.: US 8,279,108 B2
(45) Date of Patent: Oct. 2, 2012

(54) VIEWING DEVICE FOR AN AIRCRAFT COMPRISING MEANS FOR DISPLAYING AIRCRAFT EXHIBITING A RISK OF COLLISION

(75) Inventors: Christian Nouvel, Merignac (FR); Corinne Bacabara, Le Haillan (FR); Jean-Noel Perbet, Eysines (FR)

(73) Assignee: Thales, Neuilly sur Seine (FR)

( * ) Notice: Subject to any disclaimer, the term of this patent is extended or adjusted under 35 U.S.C. 154(b) by 411 days.

(21) Appl. No.: 12/542,114

(22) Filed: Aug. 17, 2009

(65) Prior Publication Data

US 2010/0060510 A1 Mar. 11, 2010

(30) Foreign Application Priority Data

Sep. 9, 2008 (FR) ...................................... 08 04947

(51) Int. Cl.
*G01S 13/93* (2006.01)
*G01S 7/04* (2006.01)
*G01S 13/00* (2006.01)

(52) U.S. Cl. ................ 342/29; 342/27; 342/61; 342/63; 342/64; 342/65; 342/175; 342/176; 342/179; 342/181; 342/182; 342/195; 701/1; 701/3; 701/14; 701/300; 701/301; 340/945; 340/961; 340/963

(58) Field of Classification Search .............. 342/27–40, 342/61–65, 175, 176, 179, 195, 25 R–25 F, 342/52–55, 180–186, 177, 178; 701/1, 3, 701/14, 16, 300, 301, 200, 207, 223, 400, 701/408, 409, 468, 492, 493, 500; 340/971–980, 340/945, 963, 970, 961; 244/75.1, 76 R, 244/175, 183; 382/276, 293, 294; 345/1.1, 345/418, 419

See application file for complete search history.

(56) References Cited

U.S. PATENT DOCUMENTS 5,313,201 A 5/1994 Ryan
(Continued)

FOREIGN PATENT DOCUMENTS

WO WO 2007/002917 1/2007

OTHER PUBLICATIONS

U.S. Appl. No. 12/547,595, filed Aug. 26, 2009, Corinne Bacabara et al.

(Continued)

*Primary Examiner* — Bernarr Gregory
(74) *Attorney, Agent, or Firm* — Lowe, Hauptman, Ham & Berner, LLP

(57) ABSTRACT

The general field of the invention is that of viewing systems of the synthetic vision type SVS, for a first aircraft, the said system comprising at least one cartographic database of a terrain, position sensors, for the said aircraft, an air traffic detection system calculating the position and the danger rating of at least one second aircraft exhibiting a risk of collision with the said first aircraft on the basis of data originating from sensors or systems such as TCAS or ADS-B, an electronic computer, a man-machine interface means and a display screen, the computer comprising means for processing the various items of information originating from the database, sensors and interface means, the said processing means arranged so as to provide the display screen with a synthetic image of the terrain comprising a representation of the said second aircraft. The said representation comprises a first symbol representing in a stylized manner the said second aircraft and a second symbol, situated to the right of the first symbol when the second aircraft is facing towards the first aircraft and situated to the left of the first symbol when the second aircraft is facing away from the first aircraft.

11 Claims, 4 Drawing Sheets

U.S. PATENT DOCUMENTS

| | | | | |
|---|---|---|---|---|
| 5,432,895 | A * | 7/1995 | Myers | 345/419 |
| 5,488,563 | A * | 1/1996 | Chazelle et al. | 701/301 |
| 5,566,073 | A * | 10/1996 | Margolin | 701/223 |
| 5,593,114 | A * | 1/1997 | Ruhl | 244/183 |
| 5,638,282 | A * | 6/1997 | Chazelle et al. | 701/301 |
| 6,157,891 | A * | 12/2000 | Lin | 701/301 |
| 6,480,120 | B1 * | 11/2002 | Meunier | 340/970 |
| 6,480,789 | B2 * | 11/2002 | Lin | 701/301 |
| 6,512,976 | B1 * | 1/2003 | Sabatino et al. | 701/207 |
| 7,120,540 | B2 * | 10/2006 | Meunier | 701/301 |
| 7,218,245 | B2 * | 5/2007 | Wyatt et al. | 340/973 |
| 7,352,292 | B2 * | 4/2008 | Alter et al. | 701/301 |
| 7,715,978 | B1 * | 5/2010 | Wenger et al. | 701/200 |
| 7,818,127 | B1 * | 10/2010 | Duggan et al. | 701/301 |
| 7,852,236 | B2 * | 12/2010 | Feyereisen et al. | 340/971 |
| 7,925,117 | B2 * | 4/2011 | Hamza et al. | 701/14 |
| 2003/0107499 | A1 * | 6/2003 | Lepere et al. | 340/945 |
| 2006/0074559 | A1 * | 4/2006 | Meunier | 701/301 |
| 2007/0171094 | A1 * | 7/2007 | Alter et al. | 340/970 |
| 2007/0297696 | A1 * | 12/2007 | Hamza et al. | 382/294 |
| 2008/0180351 | A1 * | 7/2008 | He | 345/1.1 |

OTHER PUBLICATIONS

U.S. Appl. No. 12/540,920, filed Aug. 13, 2009, Christian Nouvel et al.

U.S. Appl. No. 12/542,965, filed Aug. 18, 2009, Christian Nouvel et al.

U.S. Appl. No. 12/542,008, filed Aug. 17, 2009, Christian Nouvel et al.

* cited by examiner

VIEWING DEVICE FOR AN AIRCRAFT COMPRISING MEANS FOR DISPLAYING AIRCRAFT EXHIBITING A RISK OF COLLISION

RELATED APPLICATIONS

The present application is based on, and claims priority from, French Application Number 08 04947, filed Sep. 9, 2008, the disclosure of which is hereby incorporated by reference herein in its entirety.

BACKGROUND OF THE INVENTION

1. Field of the Invention

The general field of the invention is that of anti-collision systems for aircraft and more particularly that of the presentation of anti-collision information.

2. Description of the Prior Art

For an aircraft in flight, it is fundamental to have very precise knowledge of other aircraft situated in its immediate environment so as to avoid any risk of collision. This problem is particularly crucial in a certain number of applications where aircraft are obliged to fly at low altitude with visibility conditions which may be reduced. Historically, from the years 1960-1970 onwards, a solution independent of air traffic control has gradually emerged. This solution is known by the name of TCAS, the acronym standing for "Traffic alert and Collision Avoidance System".

Today, several families of TCAS have been developed and are used:

The first generation termed TCAS I provides only alerts of "Traffic Advisory" or TA type regarding proximity of intruders, vehicles or other aircraft presenting a risk for the aircraft. TCAS I is used essentially in general aviation, that is to say the field of small aeroplanes.

TCAS II provides on the one hand alerts of TA type regarding intruder proximity and on the other hand resolutions of conflicts by suggesting avoidance manoeuvres to the pilot. The operating mode is called RA for "Resolution Advisory". These avoidance manoeuvres are performed in a vertical plane by the craft climbing or descending. It is used essentially in commercial aviation. TCAS II was made compulsory on all airliners in the 1990s.

TCAS III, still under development, is an improvement to TCAS II additionally allowing resolution of the conflicts in RA mode in the horizontal plane through left or right turning manoeuvres.

The TCAS information can be presented to the pilot in various ways. As an example, FIG. 1 shows the presentation of the intruders on a screen of ND (Navigation Display) type. The intruders are presented in a 2D horizontal plane in relation to the aircraft 100 in so-called "ROSE" mode, for compass rose. The aircraft 100 occupies the centre of the "ROSE" 101 represented by a graduated circle. The shape and the colour of the intruders differ depending on their associated degree of danger and depending on the operating world of the TCAS.

By way of examples, the aircraft 102 is close, at a relative altitude of 1100 feet below the aircraft 100, relative altitude symbolized by the indication "−11". This aircraft is climbing, symbolized by an upward arrow in FIG. 1. It is depicted by a solid white or cyan diamond representing a threat in so-called PT mode, standing for "Proximate Traffic". According to aeronautical conventions, when the diamond is solid, the threat is of PT type, if the diamond is blank, then the threat is of OT type, signifying "Other Traffic".

The aircraft 103 is a threat in RA mode, standing for "Resolution Advisory". It is situated at a relative altitude of 100 feet below the aircraft 100 and climbing. The colour of the square which represents it is red.

The aircraft 104 is an intruder in TA mode, standing for "Traffic Advisory"; it is 900 feet above the aircraft 100 and descending. The colour of the circle which represents it is amber.

As may be seen, the interpretation of the information by the pilot is far from being immediate, and this may turn out to be particularly dangerous in the case of imminent risk of collision.

The new Synthetic Vision Systems (SVS) currently afford pilots a synthetic representation of the outside world and therefore better awareness of the surrounding dangers such as collisions with the ground without loss of control, commonly called CFIT (Controlled Flight Into Terrain). These SVS systems currently make it possible to display in 3D a synthetic terrain as well as natural or artificial obstacles (tall buildings, etc.) An improvement to the presentation of the information provided by TCAS has been proposed in the Honeywell patent application entitled "Perspective View Conformal Traffic Target Display" published under the international number WO2007/002917A1 which corresponds to U.S. application Ser. No. 11/170,356, filed Jun. 29, 2005, now U.S. Pat. No. 7,286,062. FIG. 2 shows an exemplary presentation of the intruders on a screen 200 of PFD type for "Primary Flight Display" according to the provisions of this patent application. The intruders are presented in 3D in a conformal manner, that is to say positioned at their real location in the landscape. Complementary information is associated with the intruders to aid the pilot to pinpoint their position, above or below a reference altitude and their degree of separation obtained by virtue of a variation in the dimension of the symbols. FIG. 2 presents the air traffic in a 3D conformal synthetic view of the terrain 201. This view also comprises a representation 210 of the PFD information. The intruders are presented in the forward sector of the aeroplane. The intruders 204 and 205 are represented by larger or smaller squares according to their distance relative to the aeroplane. Other symbols are added to aid the pilot to interpret the relative altitude of the intruder with respect to the aeroplane. Thus, the symbols 202 and 203 representing vertical masts give the position and the height of the intruders above the ground. This presentation is well suited to airliners which fly at relatively high altitude.

Although the new SVS systems enable the pilot to be better apprised of the situation of the intruders, in particular their type, their positioning, their behaviour, their performance etc, these new systems are insufficient to accomplish low-altitude missions.

Specifically, intruders are very rare for airliners flying by instruments, which follow pre-established flight plans in strict air corridors and are controlled from the ground with radars by the air traffic bodies. On the other hand, helicopters or small aeroplanes can fly in number at low altitude, for example, to help to rescue a large number of victims, within the framework of a "red" plan or within the framework of civil protection missions.

In this case, flight is essentially by sight, without any established flight plan and/or outside of conventional radar coverage. The visibility conditions may deteriorate in the case of night flights, dazzle from the sun, the presence of smoke in fire-fighting missions, etc. The aircraft also have more dynamic and more varied trajectories (turns, climbs, descents, etc) than those of airliners. Under these conditions, it is particularly important to properly apprise the pilot as to where the intruders are with respect to him and essentially as to their performance such as, for example, their closing speed or their danger rating.

SUMMARY OF THE INVENTION

The aim of the invention is therefore to present all the threats situated in the forward sector of an aircraft as intuitively as possible so as to render them immediately intelligible to the pilot.

More precisely, the subject of the invention is a viewing system of the synthetic vision type (SVS), for a first aircraft, the said system comprising at least one cartographic database of a terrain, position sensors for the said aircraft, an air traffic detection system calculating the position and the danger rating of at least one second aircraft exhibiting a risk of collision with the said first aircraft on the basis of data originating from reconnaissance sensors, an electronic computer, a man-machine interface means and a display screen, the computer comprising means for processing the various items of information originating from the database, sensors and interface means, the said processing means arranged so as to provide the display screen with a synthetic image of the terrain comprising a representation of the said second aircraft, characterized in that the said representation comprises a first symbol representing in a stylized manner the said second aircraft and a second symbol, situated to the right of the first symbol when the second aircraft is facing towards the first aircraft and situated to the left of the first symbol when the second aircraft is facing away from the first aircraft or vice versa.

Advantageously, the representation of the second aircraft comprises a third symbol differing from the first symbol by its shape or by its colour and disposed symmetrically with the second symbol, in such a way that when the second symbol is to the right of the first symbol, the third symbol is to the left of the first symbol and vice versa. Moreover, the first symbol comprises a horizontal segment and a fourth symbol representative of the trajectory of the second aircraft.

Preferably, the first symbol is an isosceles triangle with horizontal base and the second symbol and third symbol are circles of different colour, disposed at the two ends of the base of the said triangle. Moreover, when the second aircraft is descending, then the tip of the triangle is directed downwards and when the second aircraft is climbing, then the tip of the triangle is directed upwards; when the second aircraft is descending, then the triangle has a first texture or a first colour and when the second aircraft is climbing, then the triangle has a second texture different from the first texture or a second colour different from the first colour; the height of the triangle is proportional to the speed of climb or descent of the second aircraft, the triangle reducing to a simple segment when the second aircraft is holding level.

Advantageously, the second symbol is coloured red and the third symbol is coloured green, these being representative of the position lights of the second aircraft; when the second aircraft is at a shorter distance from the first aircraft than a safe distance, the second and third symbols flash.

Finally, the first, second and third symbols can be represented in a conformal view, that is to say at the location that they occupy in the real landscape and can have a fixed size on the display screen.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

MORE DETAILED DESCRIPTION

Figure 1:
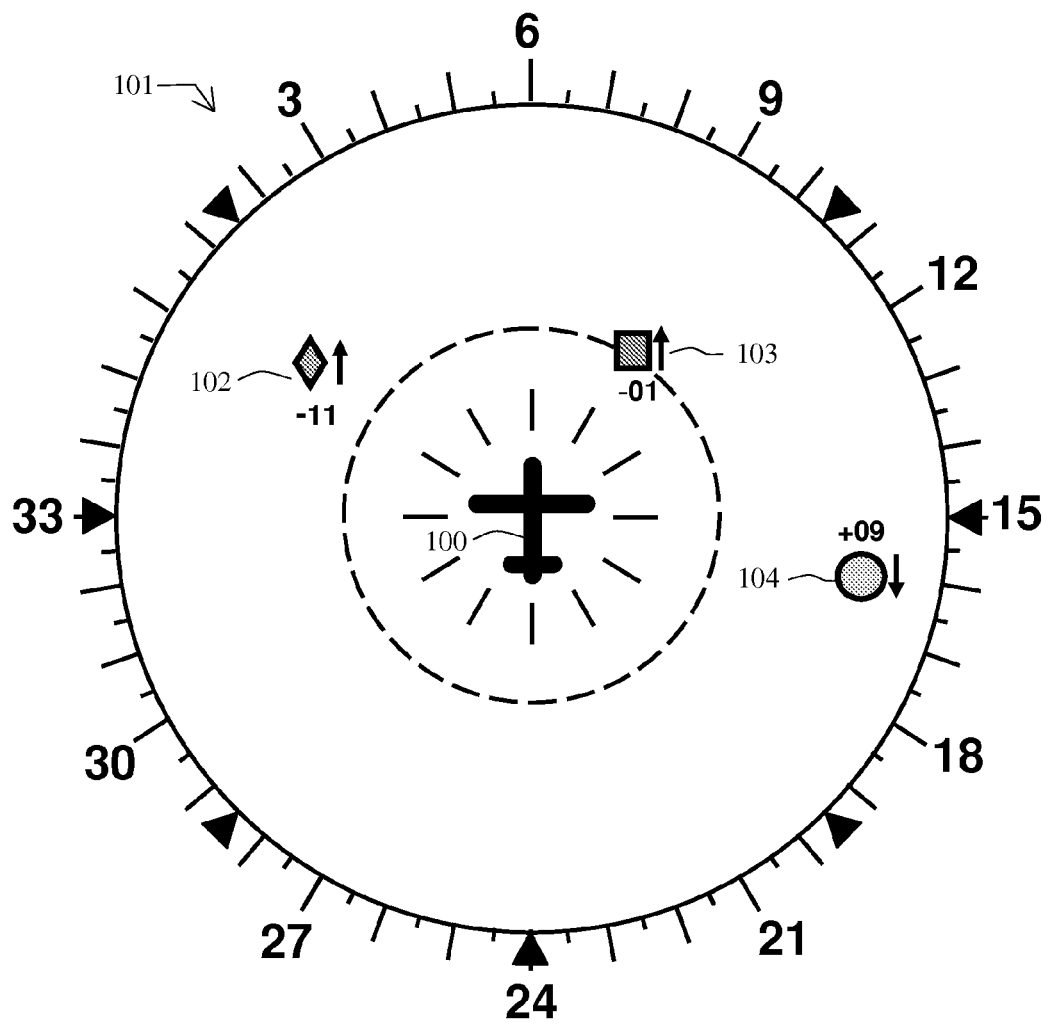
FIG. 1 represents a first presentation of the TCAS information according to the prior art.
Figure 2:
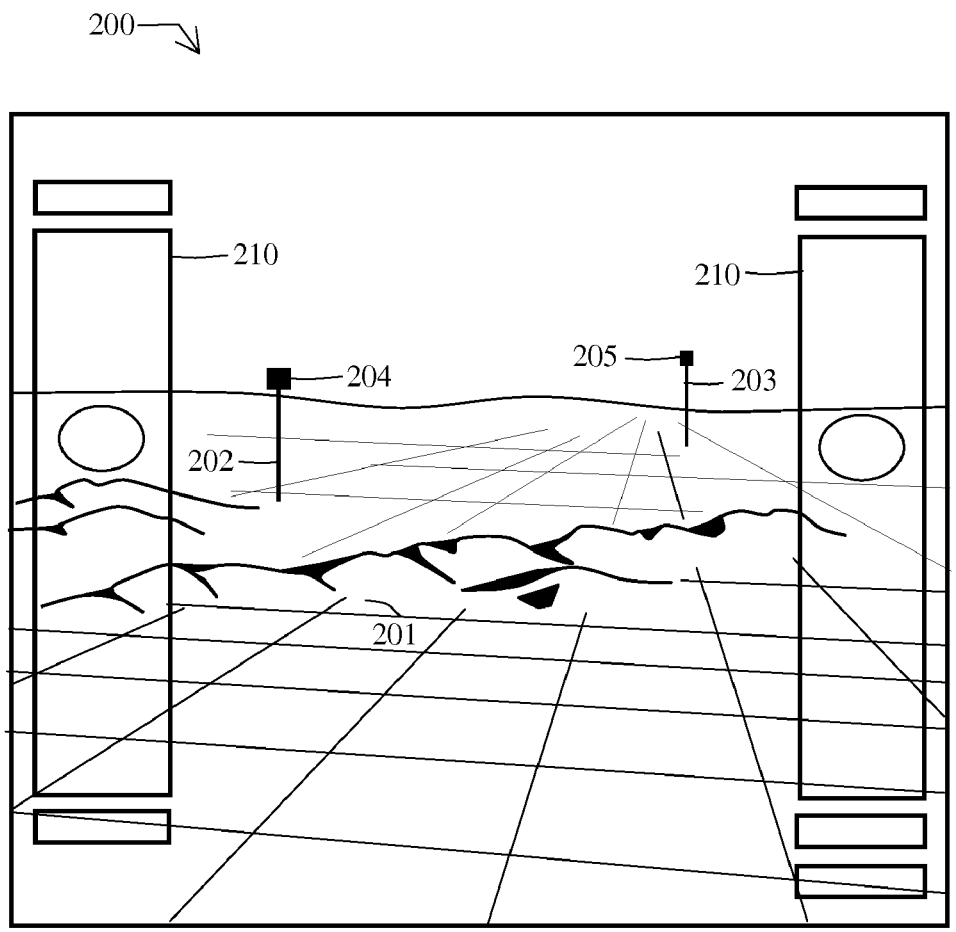
FIG. 2 represents a second presentation of the TCAS information of according to the prior art.
Figure 3:
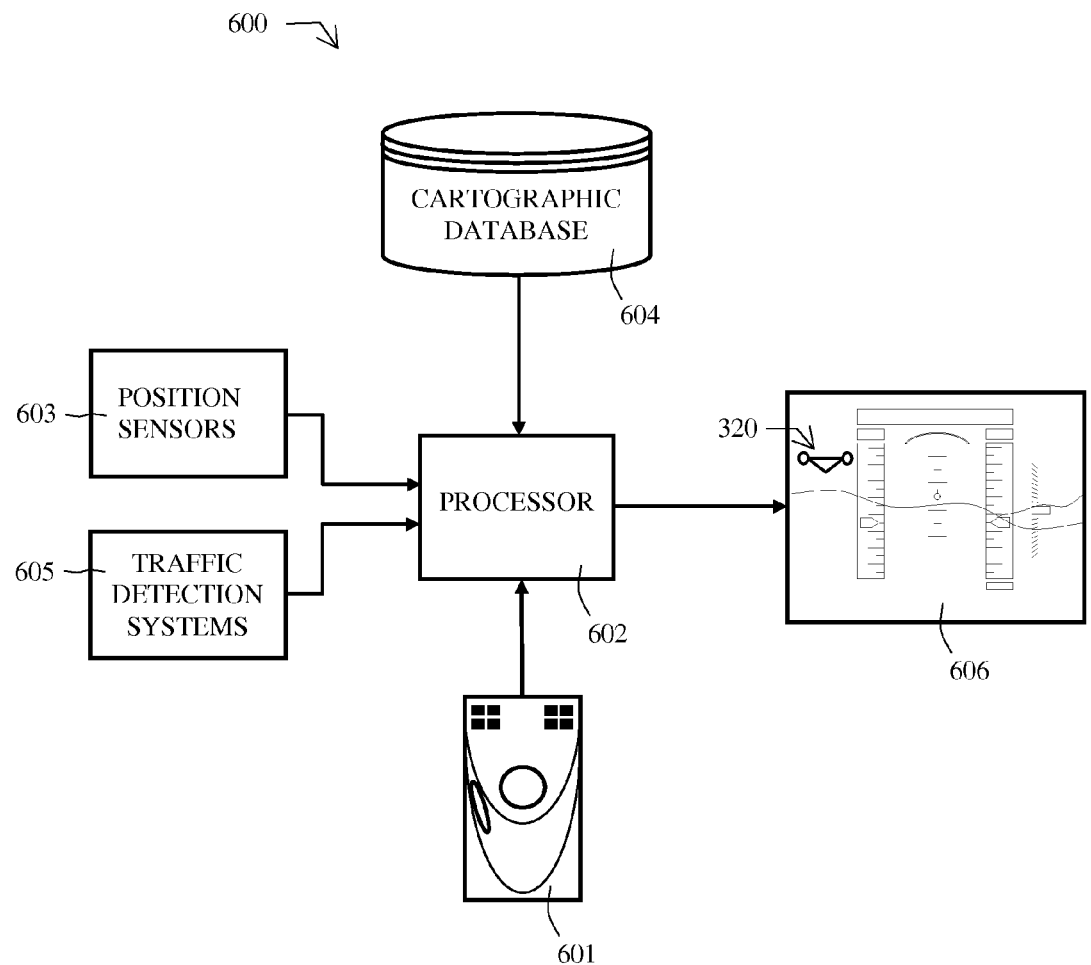
FIG. 3 represents the diagram of a viewing system according to the invention.

FIG. 3 represents an exemplary architecture of the system which is the subject of the invention.

This exemplary graphical display system 600 groups together a processor 602 configured to provide the screen 606 with the information to be displayed. One or more data sources are linked to the processor 602. These data sources include a terrain cartographic database 604 used for plotting the view in perspective, sensors 603 of the positioning of the aeroplane, an air traffic detection system 605, allowing the detection of intruders and command and control means 601 for presenting the information to the pilot.

These databases are generally positioned in the aircraft. The data can also originate from the ground through so-called "data link" transmission means. Moreover, these data can be stored on various peripherals such as diskettes, hard disks, CD-ROMs, volatile memories, nonvolatile memories, RAMs or any other means allowing data storage.

The display system also comprises man-machine interface and control means 601. These means are, for example, as represented in FIG. 3, CCDs standing for "Cursor Control Devices", means much like computer "mice". They can also be conventional control stations, control being performed by virtue of buttons, touch surfaces, etc.

The processor 602 is interfaced with hardware components which provide graphical rendition. For example, these hardware components are one or more microprocessors, memories, storage apparatus, interface cards or any other standard components. Moreover, the processor 602 operates with software or firmware. It is capable of reading machine instructions so as to carry out various tasks, calculations and functions for control and to generate the signals to be displayed and the other data used by the display screen. These instructions can be stored on diskettes, hard disks, CD-ROMs, volatile memories, nonvolatile memories, RAMs or any other means allowing data storage. All these means are known to those skilled in the art.

The processor 602 provides the data to be displayed to the display screens 606. These data comprise:

The position in terms of latitude/longitude, the speed, the heading, etc of the aircraft on the basis of the aircraft's current location originating from the position sensors 603;

The cartographic databases 604 of the terrain;
The relative position of the intruders as provided by the traffic detection systems 605;

The processor 602 is configured to receive and calculate the aircraft data namely the aircraft's current location originating from the position sensors 603 which can be an inertial platform, a GPS system, standing for "Global Positioning System", etc.

Based on the position data, the processor 602 obtains the data relating to the terrain from the terrain database 604. It dispatches them to the display screens 606 to represent a synthetic image.

The intruder sensors 605 consist of at least one TCAS system. They can also be ADS-B systems, standing for "Automatic Dependent Surveillance Broadcast" or TIS-B systems, standing for "Traffic Information Service Broadcast". Optionally, the data can be provided by a digital link of "Datalink" type. These traffic detection systems can provide the position of the intruders, the types of the intruders (helicopters, aeroplanes, others), their speed, etc.

The processor 602 is configured to receive the information, verify its consistency, store in a time-logged manner, for example, at least the last five positions of each intruder, for example in a dated circular queue and predict the future trajectory over a short time span. The number of stored values is programmable.

The intruders visible in the forward sector are presented in a 3D conformal view on a piloting PFD, signifying "Primary Flight Display", screen. The new symbologies, the subject of the invention, make it possible to instantaneously distinguish whether an intruder aircraft is closing in or moving away. The display screen 606 can be a screen with cathode ray tube, a liquid crystal (LCD) screen or any other type of screen. The display screen is generally an instrument panel screen. But, the display is not limited to this type of screen alone. Thus, the display screen 606 can be the source of images of a head-up display, known by the acronym HUD standing for "Head-Up Display" or form part of helmet viewing optics or of night vision goggles. It is also possible for the display screen to form part of an on-windscreen projection system.

Figure 4:
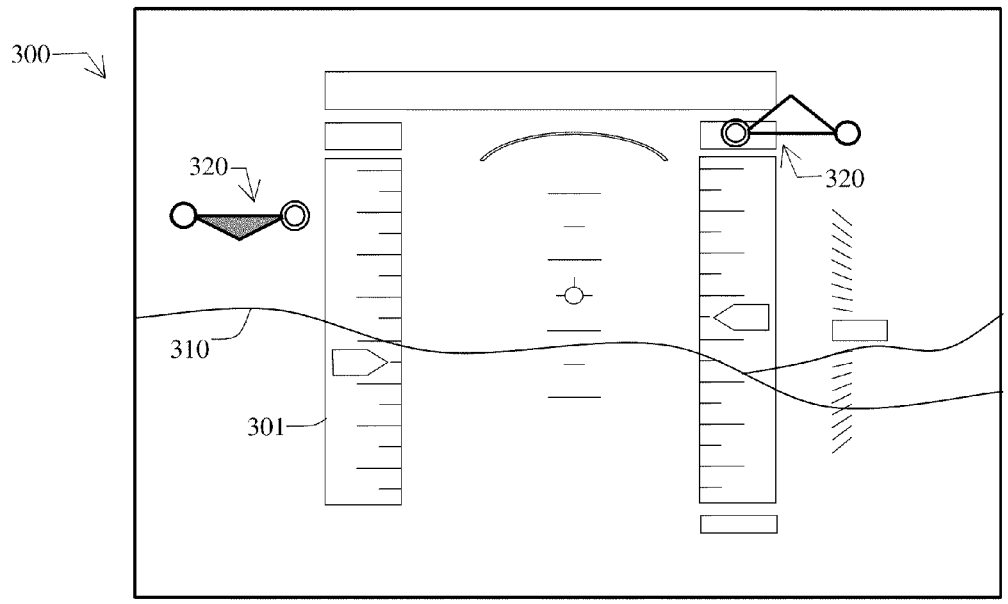
FIG. 4 represents an overall view of a TCAS display according to the invention.

FIG. 4 presents intruder aircraft in a 3D conformal synthetic view. These intruders are presented in the forward sector of the aeroplane. The image 300 is used to display the graphical view which represents the real world situated outside of the aircraft and which is coupled with a symbology 301 of Primary Flight Display (PFD) type. It contains a representation of the terrain 310 in a three-dimensional or 3D view, namely mountains, relief, etc.

Two intruders 320 are represented in the forward visual field. A clearance on the transparency is effected so as not to interfere with the reading of the conventional symbology of the PFD: it can be fixed for example at 50%. The default colour is grey-white used for portraying the conventional symbology. This may be any other colour while complying with aeronautical standards.

The perspective view may equally well be egocentric, that is to say viewed from the current position of the aircraft or exocentric, that is to say viewed from a point other than the current position of the aircraft. The user can choose between these two modes of representation through the control panel 601.

Only the intruders present between the aircraft and a certain duration selected either by the pilot, or automatically by the computer are represented. This duration is calculated on the basis of the distance of the intruders and their closing speed. It will not be possible for the minimum duration set by the pilot to be less than 30 seconds.

Figure 5:
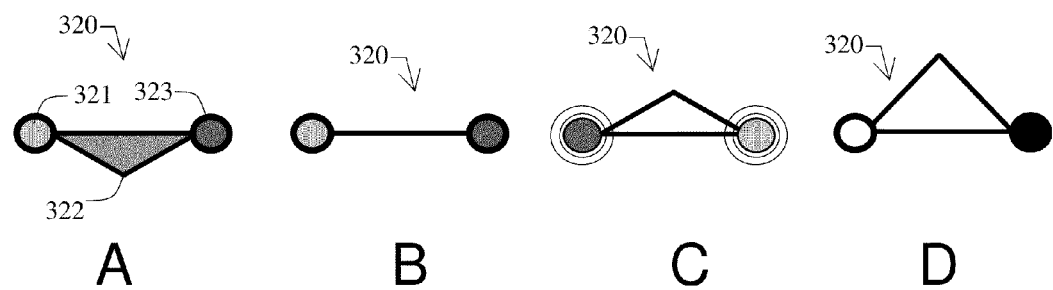
FIG. 5 represents various representations of aircraft present in the display according to their position and their attitude.

By way of non-limiting examples, FIG. 5 represents four possible configurations of the symbol 320 denoted A, B, C and D. The symbol 320 is composed of three main parts:
a horizontal vector and a fourth symbol for a V-shaped or inverted V-shaped type of trajectory, the whole forming an isosceles triangle 322;
two symbols which represent the lamps 321 and 323 at the wingtips of the aircraft.

The symbols 321 and 323 are represented by circles. When the intruder is closing in head-on, the colour of the lamp 321 is green and the colour of the lamp 323 is red (configurations A and B of FIG. 5 where the colours are replaced with shades of grey). In the other cases (configuration C of FIG. 5), intruder travelling in the same direction as the aeroplane, the colour of the lamp 321 is red and the colour of the lamp 323 is green. This choice of colour applies in accordance with the international rules of the ICAO (International Civil Aviation Organization) and also applies to ships.

The symbol 322 indicates that the intruder is climbing or descending with respect to the aeroplane. This symbol 322 is represented by a triangle of variable height but may equally well be represented by an arrow. When the intruder is holding level, this symbol 322 coincides with a straight segment as indicated on configuration B of FIG. 5. The two faces of the triangle have a presentation attribute differing either through colour, or through texture depending on the indication being climbing or descending. Thus, the grey triangle of configuration A represents an aircraft descending and the white triangles of configurations C and D represent an aircraft climbing. The triangle of configuration D has a greater height than that of the triangle of configuration C because the speed of climb of the aircraft that it represents is greater.

In the case where the viewing screen is monochrome, the green-coloured lamp is replaced by a solid circle and the red-coloured lamp by a blank circle as indicated on configuration D of FIG. 5. It is also possible to use different textures.

It is also noted that, when an intruder is situated about 30 seconds away and closing, the two symbols 321 and 323 begin to flash alternately with a period of the order of two seconds as indicated on configuration C where the flashing is depicted by concentric thin circles. This makes it possible to draw the pilot's attention to close intruders.

All the intruders are portrayed in a conformal manner, linked to the landscape on the viewing screen. It will be noted that the width of the intruders is fixed and does not depend on the distance. It is chosen as a function of the rules of the art of user-friendliness so as to ensure good readability by day and night.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A viewing system of a synthetic vision, for a first aircraft, said viewing system comprising:
a cartographic database of a terrain;
position sensors for said first aircraft;
an air traffic detection system calculating a position and a danger rating of at least one second aircraft exhibiting a risk of collision with said first aircraft on the basis of data originating from reconnaissance sensors;
an electronic computer;
a man-machine interface device; and a display screen;
wherein the electronic computer includes a processor configured to process various items of information originating from the cartographic database, the position sensors, and the man-machine interface device,
wherein said processor is arranged to provide the display screen with a synthetic image of the terrain comprising a representation of said second aircraft,
wherein said representation comprises a first symbol representing in a stylized manner said second aircraft and a second symbol, situated to the right of the first symbol when the second aircraft is facing towards the first aircraft and situated to the left of the first symbol when the second aircraft is facing away from the first aircraft or vice versa.

2. The viewing system according to claim 1, wherein the representation of the second aircraft comprises a third symbol differing from the first symbol by its shape or by its color and disposed symmetrically with the second symbol, in such a way that when the second symbol is to the right of the first symbol, the third symbol is to the left of the first symbol and vice versa.

3. The viewing system according to claim 2, wherein the first symbol comprises a horizontal segment and a fourth symbol representative of a trajectory of the second aircraft.

4. The viewing system according to claim 3, wherein the first symbol is an isosceles triangle with horizontal base and the second symbol and third symbol are circles of different color or of different texture, disposed at the two ends of the base of the said triangle.

5. The viewing system according to claim 4, wherein, when the second aircraft is descending, then the tip of the triangle is directed downwards and when the second aircraft is climbing, then the tip of the triangle is directed upwards.

6. The viewing system according to claim 4, wherein, when the second aircraft is descending, then the triangle has a first texture or a first color and when the second aircraft is climbing, then the triangle has a second texture different from the first texture or a second color different from the first color.

7. Viewing system according to claim 4, wherein a height of the triangle is proportional to the speed of climb or descent of the second aircraft, the triangle reducing to a simple segment when the second aircraft is holding level.

8. The viewing system according to claim 4, wherein the second symbol is colored red and the third symbol is colored green, said second and third symbols being representative of the position lights of the second aircraft.

9. The viewing system according to claim 4, wherein, when the second aircraft is at a shorter distance from the first aircraft than a safe distance, the second and third symbols flash.

10. The viewing system according to claim 4, wherein the first, second and third symbols are represented in conformal view, that is to say at the location that they occupy in the real landscape.

11. The viewing system according to claim 4, wherein the first, second and third symbols have a fixed size on the display screen.

* * * * *